(12) United States Patent
Fox et al.

(10) Patent No.: US 7,650,735 B2
(45) Date of Patent: Jan. 26, 2010

(54) HIGH DENSITY COTTON PICKER BAR AND SPINDLE ASSEMBLY THEREFOR

(75) Inventors: Jeffrey Robert Fox, Minburn, IA (US); Mark S. Philips, Grimes, IA (US)

(73) Assignee: Deere & Company, Moline, IL (US)

( * ) Notice: Subject to any disclaimer, the term of this patent is extended or adjusted under 35 U.S.C. 154(b) by 652 days.

(21) Appl. No.: 11/058,150

(22) Filed: Feb. 15, 2005

(65) Prior Publication Data
US 2006/0179808 A1    Aug. 17, 2006

(51) Int. Cl.
*A01D 46/14* (2006.01)
(52) U.S. Cl. .................................. 56/36; 56/28; 56/40
(58) Field of Classification Search ................ 56/27, 56/28, 33–36, 40–50; D15/26
See application file for complete search history.

(56) References Cited

U.S. PATENT DOCUMENTS

| 329,810 | A | * | 11/1885 | Bugg | 56/42 |
|---|---|---|---|---|---|
| 372,918 | A | * | 11/1887 | Langley | 56/41 |
| 456,173 | A | * | 7/1891 | Todd | 56/44 |
| 475,979 | A | * | 5/1892 | Foote | 56/44 |
| 501,670 | A | * | 7/1893 | Beekman | 56/45 |
| 1,054,113 | A | * | 2/1913 | Haring | 56/44 |
| 2,705,860 | A | * | 4/1955 | Fergason | 56/42 |
| 3,220,169 | A | | 11/1965 | Keith | |
| 3,387,437 | A | * | 6/1968 | Owen | 56/13.2 |
| 3,540,196 | A | | 11/1970 | Mabry et al. | |
| 4,463,543 | A | | 8/1984 | Hubbard et al. | 56/44 |

\* cited by examiner

*Primary Examiner*—Alicia M Torres

(57) ABSTRACT

A picker bar includes spindles which are nonaligned in the vertical direction to define two or more offset sets of spindles on the bar and increase the number of spindles per unit length of the spindle bar. A spindle assembly includes support carrying two spindles driven from a picker bar drive shaft by single drive gear. Driven spindle gears are spaced on opposite sides of the shaft axis to facilitate close spacing of the spindles.

7 Claims, 5 Drawing Sheets

HIGH DENSITY COTTON PICKER BAR AND SPINDLE ASSEMBLY THEREFOR

FIELD OF THE INVENTION

The present invention relates generally to cotton harvesters and more specifically to spindle picker bars for cotton picker row units.

BACKGROUND OF THE INVENTION

Cotton harvesters often have a row unit structure with picker drums rotatable about upright axes adjacent a row-receiving area of the unit. The drum includes a plurality of upright picker bars having spindles which rotate in contact with cotton plants to remove the cotton. Corresponding spindles on the bars define generally horizontal spindle planes, with a typical drum having eighteen to twenty spindle planes. Doffers which rotate between the spindle planes in contact with the spindles to doff cotton wound on the spindles and direct the cotton towards air door structure for removal from the unit towards a basket or processor.

A conventional picker bar includes a single row of spindles spaced uniformly in the vertical direction. Each spindle includes a gear end engaged by a mating bevel gear located on an upright spindle drive shaft supported for rotation within a hollow portion of the bar. The spacing between the spindle planes and thus the density of the spindles on the picker bar is limited by the spindle support and spindle drive arrangement. Currently available drive shaft bevel gear and the spindle nut mounting arrangements prevent closer spacing of spindles. Therefore, increasing the spindle density for increased drum productivity while maintaining the reliability of the spindle, spindle bar and spindle drive has heretofore been a continuing source of difficulty.

SUMMARY OF THE INVENTION

A picker bar includes spindles which are nonaligned in the vertical direction to define two or more offset sets of spindles on the bar and facilitate closer vertical spacing of the spindles. The number of spindles per unit length of the spindle bar is thereby increased to provide more spindles in the pick zone for increased productivity.

In one embodiment of the invention, two spindles of a twin spindle assembly are driven by a central gear which, in turn, is driven by bevel gear mounted to the picker bar driveshaft. The two spindles are mounted at an angle to the vertical plane of the bar to define two vertical planes of spindles. The reduced number of drive gears on the drive shaft allows an increased total number of spindles on each picker bar and provides an increased number of horizontal spindle planes. The spindle plane spacing for the pair of spindles may be different than the spacing between planes for adjacent spindles in adjacent pairs, and doffing with such spacing is achieved with a doffer column having two different sizes or spacing of doffer pads.

Various drives, including a crossed helical drive, double shaft drive, spiral bevel gear drive, or a hypoid gear set can be utilized to achieve more than one vertical plane of spindles on a spindle bar. Two or more picker spindle planes lying on either side of the central axis of the bar allows the horizontal distance between the two closest pick zones to be reduced. With helical or hypoid type gear drives, the spindle planes may be offset from a parallel relationship. For example, by slightly angling the planes relative to one another, horizontal spindle distribution in the pick zone can be improved.

In an embodiment of the invention, two vertical planes of spindles on a spindle bar are offset from the central axis of the bar. As the bar is rotated on this axis by the cam in the doffing zone, the relation of the spindle to the doffer varies from one spindle of the pair to the other. A unique doffer arrangement having doffers of two different diameters optimizes the critical positional relationship between the spindles and the doffers for the spindles in the doffing zone.

These and other objects, features and advantages of the present invention will become apparent from the description below and the drawings.

DESCRIPTION OF THE PREFERRED EMBODIMENT

Figure 1:
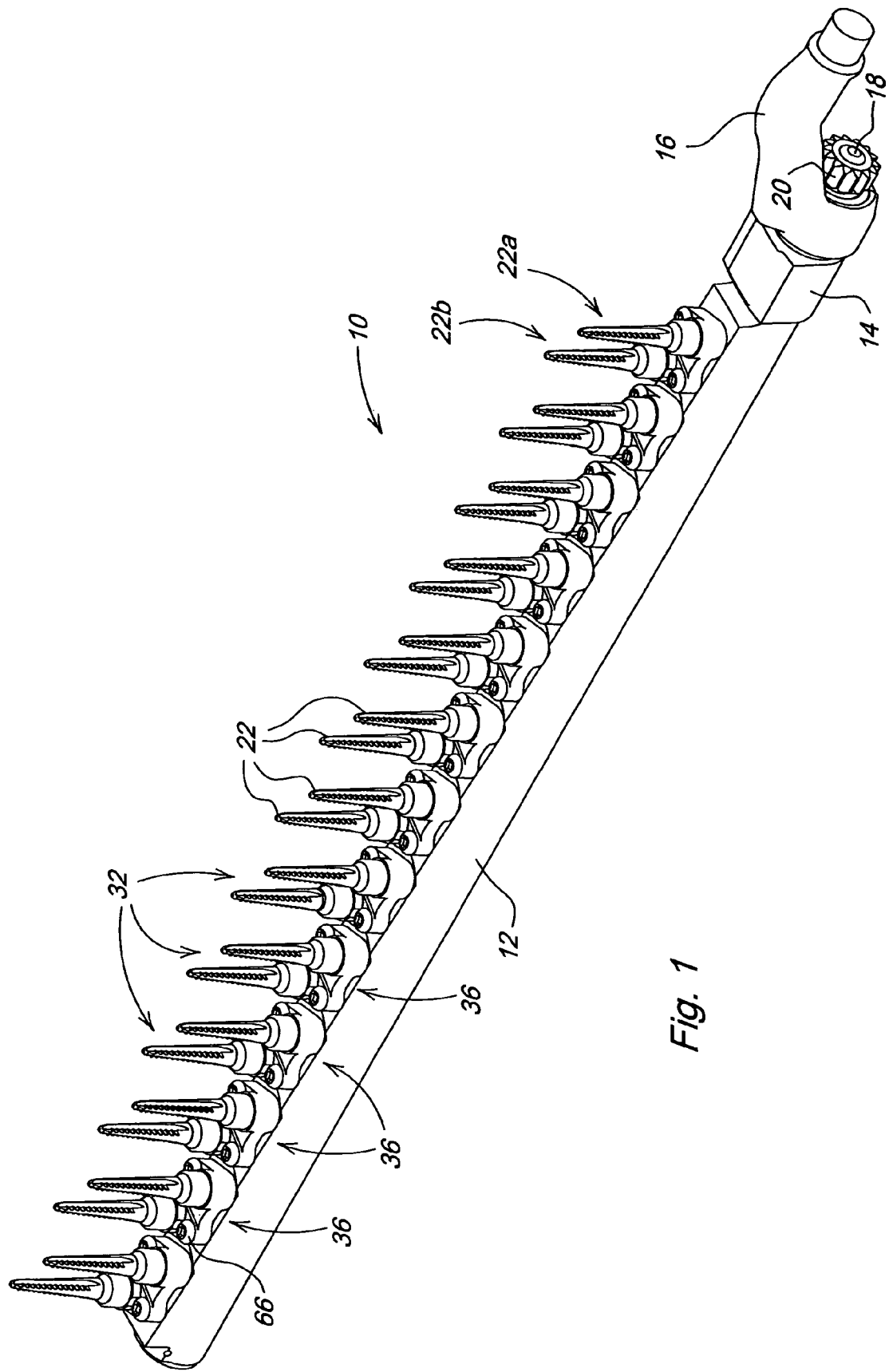
FIG. 1 is a perspective view of a cotton picker bar.
Figure 2:
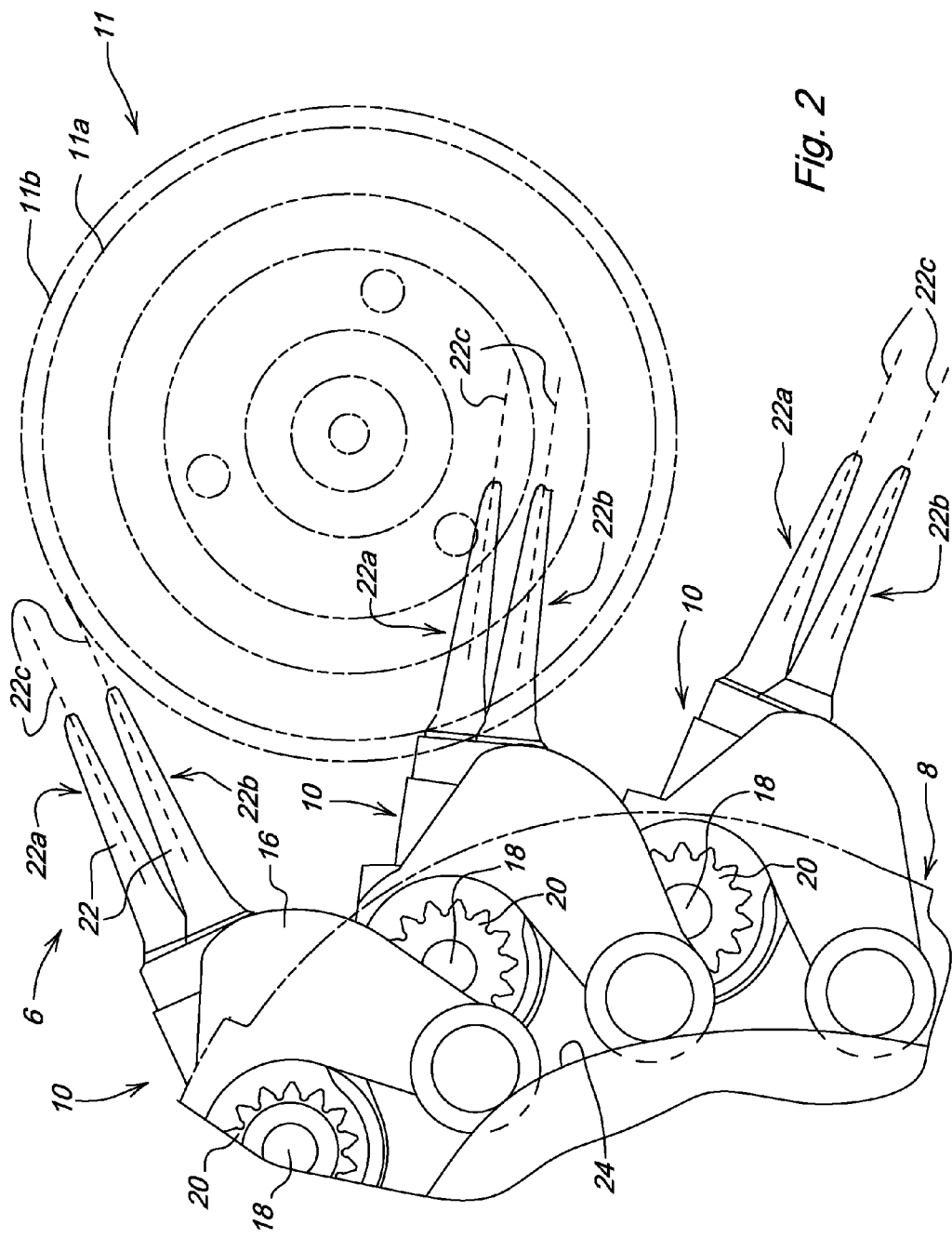
FIG. 2 is a top view of a portion of a cotton picker row unit including the picker bar of FIG. 1.

Referring to FIGS. 1 and 2, therein is shown a portion of a cotton picker row unit 6 having a picker spindle drum 8 with picker spindle bar assemblies 10. A doffer assembly 11 with doffer pads 11a and 11b is supported in the row unit adjacent the path of the picker bar assemblies 10. Each picker bar assembly 10 includes a hollow picker bar 12 with an upper end 14 adapted for journaling in the row unit drum head and receiving a cast cam follower arm 16. A spindle drive shaft 18 is rotatably mounted in the hollow picker bar 12. A driven gear 20 is fixed to the upper end of the shaft 18 for meshing with a conventional drive gear such as sun gear (see 21 of FIG. 5).

The picker bar assembly 10 includes at least two sets 22a and 22b of spindles 22 having axes of rotation 22c. As can be appreciated from the figures, the two sets of spindles 22a and 22b are nonaligned in the vertical direction and are offset on opposite sides of the drive shaft 18. The follower arm 16 is seated in a cam track 24 (FIG. 2) to properly orient the bar 12 during harvesting so that the spindles 22 are maintained in a preselected attitude when removing cotton from the plants and when passing by the doffer assembly 11 and a conventional moistener pad assembly (not shown).

Figure 3:
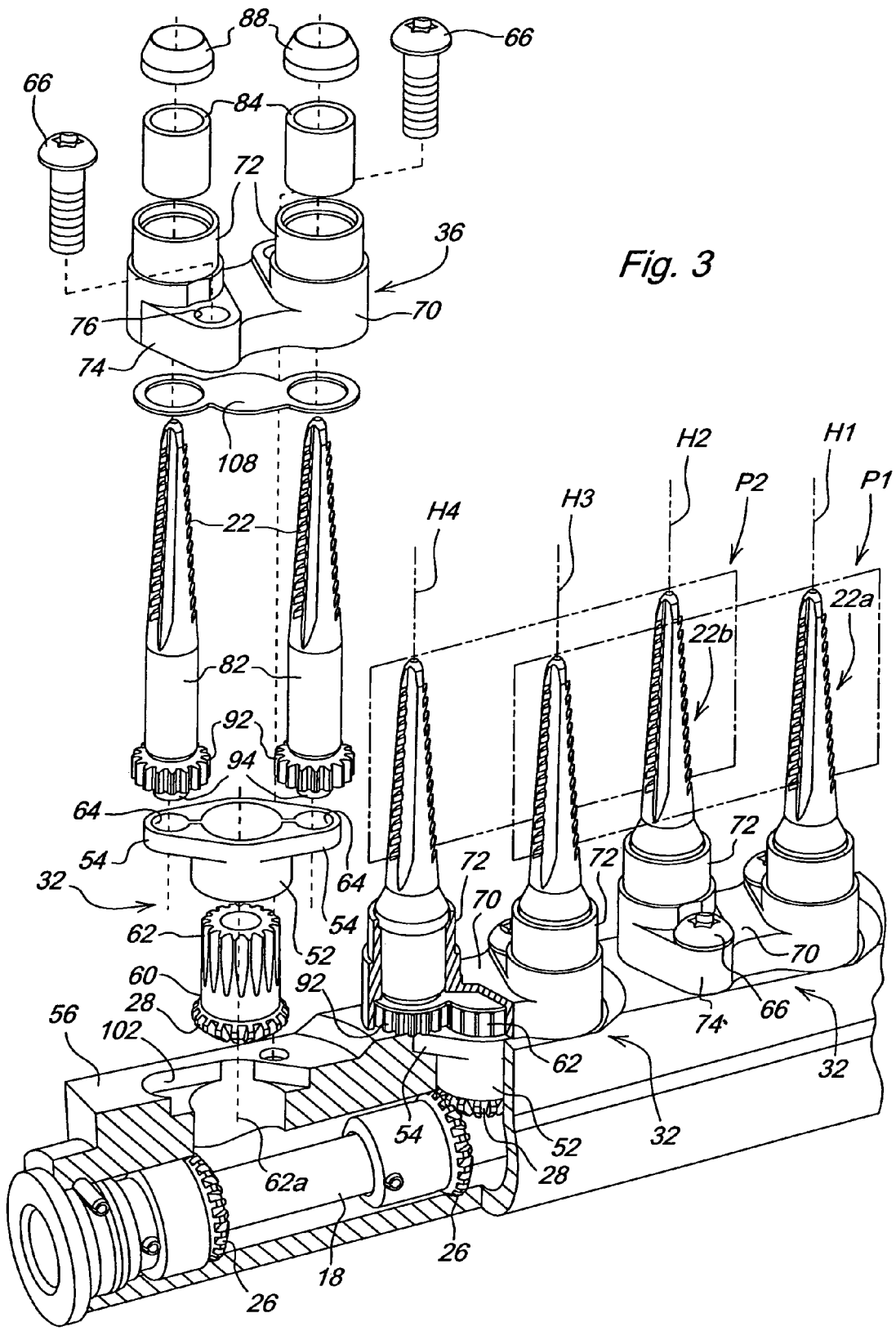
FIG. 3 an enlarged view, partially exploded and in section, showing a portion of the picker bar of FIG. 1 and the spindle support and drive arrangement.

As shown in FIG. 3, the drive shaft 18 supports bevel pinions 26. Each of the bevel pinions 26 meshes with a pinion 28 on a corresponding spindle assembly 32. The assemblies 32 include a pair of spindles 22 with one of the pair of spindles located in a plane P1 and the other of the pair located in a plane P2. The spindles 22 are rotatably supported in the bar 12 by twin spindle mounting assemblies 36. A plane passing through the axes 22c of the spindles of a spindle pair is angled with respect to the horizontal so that a spindle pair defines two separate spindle picking planes (for example, see H1, H2 and H3, H4 of FIG. 3). As shown the spindle picking planes are uniformly spaced in the vertical direction. However, other spacing configurations can be provided. For example, it may be advantageous to have a different spacing between spindle planes (H1, H2) for spindles of a spindle pair than the planes (H2, H3) for adjacent spindles on different spindle pairs.

As shown, the upper spindle 22 of each spindle pair lies in the spindle set 22a while the lower spindle of the pair lies in the spindle set 22b. The doffer column 11 includes doffer pads 11a and 11b. The doffer pads 11a that doff cotton from the spindle sets 22a are smaller in diameter than the doffer pads 11b that doff cotton from the spindle sets 22b. Since the two vertical planes of spindles on the bar 12 are offset from the central axis of the bar, the relation of the spindle to the doffer varies from one spindle of the pair to the other as the action of the follower arm 16 in the cam track 24 rotates the bar 12. By providing doffers of differing diameter, the angular relation between the spindles 22 being doffed and the rotating doffer pads 11a and 11b are optimized for both spindles of the pair in the doffing zone as shown in FIG. 2. The spacing between the individual doffer pads 11a, 11b assures proper vertical alignment with the spindle planes H1-H4.

As shown in the drawing figures, the spindles 22 are supported from the picker bar 12 in the upright planes P1 and P2 for rotation by the drive shaft 18. The upright planes P1 and P2 as shown in FIG. 3 are generally parallel and located adjacent but offset from each other. However, if the driving gears for the spindle drive are crossed helical or hypoid type, the planes P1 and P2 may be offset from a parallel relationship. By angling the planes away from or towards one another, horizontal spindle distribution in the pick zone can be optimized.

The twin spindle mounting assemblies 36 for each spindle assembly 32 include a drive gear journal 52 (FIG. 3) with mounting flanges 54 which abut an apertured flat 56 formed on the bar 12. A combination gear 60 includes a cylindrical central portion rotatably supported within the journal 52. The inner end of the combination gear 60 includes the spindle assembly pinion 28, and the journal supports the driven pinion 28 in contact with the drive shaft bevel pinion 26. The opposite end of the combination gear includes a spur gear 62 which projects outwardly from the outer face of the journal 52 which rotates about a gear axis 62a perpendicular to the axis of the drive shaft 18.

The mounting flanges 54 include diametrically opposed bores 64 rotatatably mounting the driven ends of the two spindles 22. The twin spindle mounting assembly 36 is secured over central journal areas of the spindles 22 and over the drive gear journal 52 by mounting screws threaded into the apertured flat 56. The mounting assembly 36 includes a base 70 with outwardly projecting spindle journal areas 72 with flanges 74 having apertures 76 for receiving the mounting screws 66. The spindles 22 include cylindrical bearing areas 82 received within bushings 84 located in the journal areas 72. The picking ends of the spindles 22 project from the journal areas 72, and dust caps 88 help seal the bearing area.

The driven ends of the spindles 22 include spur gears 92 which mesh with the spur gear 62 to rotate the spindles about their axes 22c on opposite sides of the axis of the combination gear 62. Cylindrical bearing areas 94 project inwardly towards the bar 12 from the driven end of the spindles 22 and are rotatably supported in the bores 64 of the drive gear journal 52. The journal 52 is supported within a recessed area 102 in the flat 56.

The base 70 is recessed to receive the spindle spur gears 92. A double washer 108 is received over the spindle bearing areas 82 between the spur gears 62, 92 and the recessed portion of the base 70.

Figure 4:
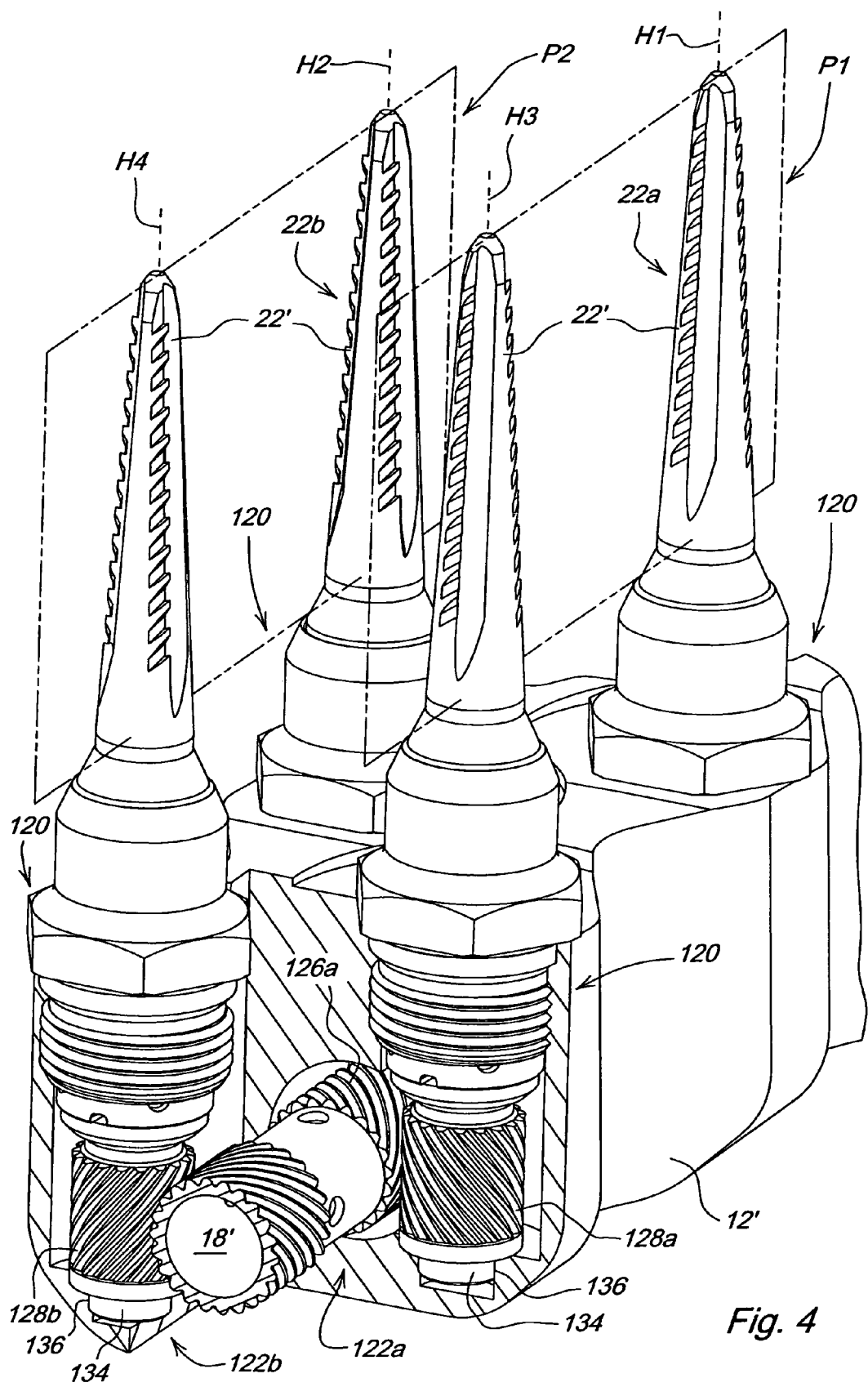
FIG. 4 is an enlarged view of an alternate drive arrangement for the spindles.

In the embodiment shown in FIG. 4, a more conventional spindle nut assembly 120 mounts spindles 22' directly in the spindle bar 12' on opposite sides of a single spindle drive shaft 18'. Crossed helical drives 122a and 122b rotate the spindles 22 in the same direction about the spindle axes from the single shaft 18'. The spindles 22 of the set 22a and the spindles 22 of the set 22b are on the opposite sides of the shaft 18' so the drive 122a is the opposite hand of that of 122b so all the spindles rotate in the same direction. The drives 122a and 122b include drive gears 126a and 126b which can either be formed directly into the drive shaft 18' or can be separate gears pinned to the shaft. The spindles 22' including driven ends having driven gears 128a and 128b projecting inwardly from the spindle nut assembly 120. Cylindrical bearing areas 134 project axially from the driven ends and are rotatably supported by journal areas 136 formed in the bar 12'.

Figure 5:
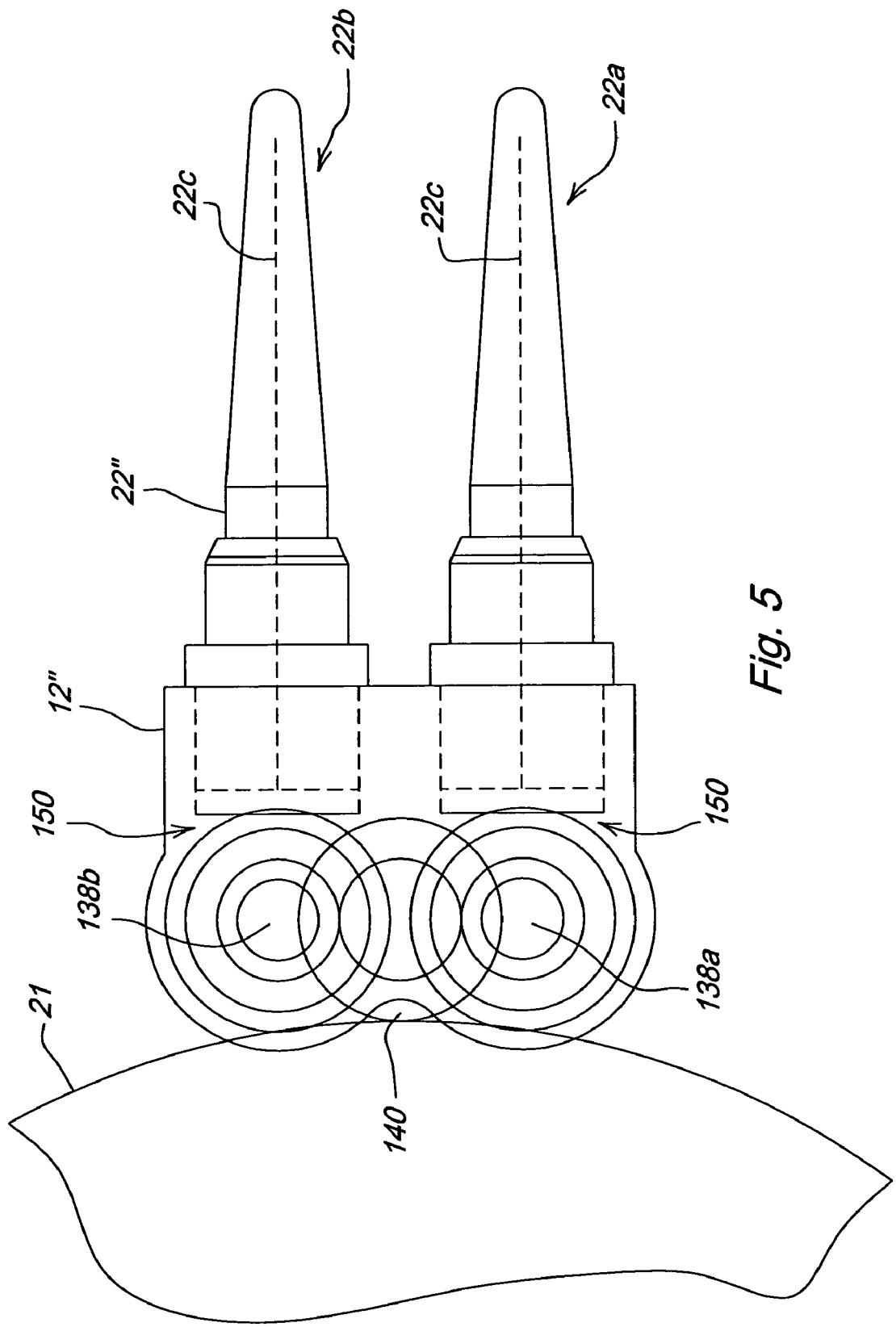
FIG. 5 is a top view of an alternate embodiment of a cotton picker bar having two spindle drive shafts.

In another embodiment shown in FIG. 5, a double driveshaft bar 12" provides drive to the two sets of spindles 22a and 22b. The sun gear 21 drives a single intermediate gear 140 on the double driveshaft bar 12". As shown, the intermediate gear 140 is centered between drive shafts 138a and 138b and is a combination gear having two gear profiles rotatable about a common gear axis. The first profile engages the sun gear and is sized to provide the proper gear ratio. The second profile is sized to give the desired spacing between the drive shafts 138a and 138b. Alternatively, one of the shafts 138a and 138b may be driven directly from the gear 21, with the second shaft driven from the first through an intermediate gear to keep the direction of rotation the same for both shafts. In this alternative arrangement, one upright plane of spindles would be aligned with the rotational axis of the bar 12" and one would be offset from the axis. The arrangement shown in FIG. 5 provides an equal offset for both planes of spindles to facilitate better spindle orientation relative to the doffer column 11. A conventional bevel drive arrangement 150 is utilized between the spindles 22 and the drive shafts 138a and 138b.

Having described the preferred embodiment, it will become apparent that various modifications can be made without departing from the scope of the invention as defined in the accompanying claims.

The invention claimed is:

1. A cotton picker spindle bar assembly including an upright single spindle bar having an arm for orienting the bar about an upright bar axis, the spindle bar mounting a plurality of vertically spaced spindles having picking ends and gear ends, drive shaft structure including an upright drive shaft supported for rotation by the bar in driving relationship with the gear ends, wherein the plurality of vertically spaced spindles on the spindle bar include at least two sets of spindles vertically spaced on the single spindle bar and nonaligned in the vertical direction, the arm orienting the two sets of spindles in cotton plants during picking with the gear ends extending generally horizontally from one side of the spindle bar.

2. A cotton picker spindle bar assembly including an upright single spindle bar having an arm for orienting the bar about an upright bar axis, the spindle bar mounting a plurality of vertically spaced spindles having picking ends and gear ends, drive shaft structure including an upright drive shaft supported for rotation by the bar in driving relationship with the gear ends, wherein the plurality of vertically spaced spindles on the spindle bar include at least two sets of spindles vertically spaced on the single spindle bar and nonaligned in the vertical direction, the arm orienting the two sets of spindles in cotton plants during picking with the gear ends extending generally horizontally from one side of the spindle bar; and wherein each spindle set is supported in an upright plane from the spindle bar for rotation by the drive shaft structure, the upright planes of at least two spindle sets are located adjacent and offset from each other.

3. A cotton picker spindle bar assembly including an upright spindle bar, the spindle bar supporting a plurality of vertically spaced spindles having picking ends and gear ends, drive shaft structure supported for rotation by the bar in driving relationship with the gear ends, wherein the plurality of vertically spaced spindles include at least first and second sets of spindles defining first and second columns of spindles, respectively, wherein the spindles include first spindles in the first set and second spindles in the second set, wherein the first spindles are offset vertically and nanoligned in the vertical direction relative to the second spindles, and the drive shaft structure includes single gears each for driving the gear ends of a pair of spindles comprising a first spindle and a second spindle, wherein the single gears and the first and second spindles define axes of rotation, and wherein the axes of rotation are parallel.

4. The spindle bar assembly as set forth in claim 3 wherein the single gears are located between the gear ends of the first and second spindles.

5. The spindle bar assembly as set forth in claim 2 wherein the spindles are mounted in pairs of spindles comprised of a spindle from each set of spindles, the pairs of spindles mounted at an angle to the upright bar axis to define first and second generally horizontal picking planes.

6. A cotton picker spindle bar assembly including an upright spindle bar, the spindle bar supporting a plurality of vertically spaced spindles having picking ends and gear ends, drive shaft structure supported for rotation by the bar in driving relationship with the gear ends, wherein the plurality of vertically spaced spindles include at least first and second columns of spindles nonaligned in the vertical direction, wherein the first column of spindles includes first spindles and the second column of spindles includes second spindles, wherein the first spindles in the first column of spindles are offset vertically from the second spindles in the second column of spindles to define spindle pairs including first and second spindles, and the drive shaft structure includes single gears each for driving the gear ends of the first and second spindles of each spindle pair with the picking ends extending outwardly in generally the same direction from the spindle bar.

7. The spindle bar assembly as set forth in claim 3 wherein the first and second spindles are supported in a spindle mounting assembly with the gear ends offset from each other, and wherein the drive shaft structure includes the single gears rotatably supported in the spindle mounting assembly between the gear ends of the first and second spindles.

* * * * *